(12) United States Patent
Koch et al.

(10) Patent No.: US 6,613,857 B1
(45) Date of Patent: Sep. 2, 2003

(54) UV-CROSSLINKED, PRESSURE-SENSITIVE ADHESIVES

(75) Inventors: Carol A. Koch, San Gabriel, CA (US); Liem T. Ang, South Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/206,540

(22) Filed: Jul. 26, 2002

(51) Int. Cl.⁷ .............................................. C08F 220/12
(52) U.S. Cl. ................. 526/329.6; 526/264; 526/320; 526/321; 526/328.5; 526/332
(58) Field of Search ................. 526/264, 320, 526/321, 328.5, 329.6, 332

(56) References Cited

U.S. PATENT DOCUMENTS

| | | |
|---|---|---|
| 4,045,517 A | 8/1977 | Guerin et al. |
| 4,152,189 A | 5/1979 | Guerin et al. |
| 5,047,443 A | 9/1991 | Rehmer |
| 5,429,590 A | 7/1995 | Saito et al. |
| 5,468,821 A | 11/1995 | Lucast et al. |
| 5,641,567 A | 6/1997 | Brown et al. |
| 5,783,209 A | 7/1998 | Imamura et al. |
| 6,203,900 B1 | 3/2001 | Saika et al. |
| 6,262,330 B1 | 7/2001 | Fujisawa et al. |
| 6,395,360 B1 * | 5/2002 | Takahira et al. ........... 428/40.1 |

FOREIGN PATENT DOCUMENTS

WO    WO 01/16244 A1    3/2001

* cited by examiner

Primary Examiner—Helen L. Pezzuto
(74) Attorney, Agent, or Firm—Christie, Parker & Hale, LLP

(57) ABSTRACT

A composition that can be coated as a hot melt or as a high solids content solution comprises, on a percent-by-weight basis, 85–99.7% of at least one acrylic copolymer, 0.1–5% of at least one photoinitiator, and 0.2–10% of at least one multifunctional (meth)acrylate. The composition is readily crosslinked by exposure to ultraviolet light to yield a high-performance acrylic PSA.

16 Claims, 1 Drawing Sheet

UV-CROSSLINKED, PRESSURE-SENSITIVE ADHESIVES

FIELD OF THE INVENTION

Acrylic pressure-sensitive adhesive (PSA) compositions that can be coated as a hot melt (100% solids) or as a high solids coating (>60% solids) and crosslinked by ultraviolet (UV) light are provided. The adhesives are based on copolymers of alkyl acrylate(s), ethylenically unsaturated carboxylic acid(s), N-vinyl lactam(s), and ether monomer(s), the latter serving as a photosynergist and containing at least one labile hydrogen atom that is easily abstracted during the UV crosslinking step. The polymers are compounded with a photoinitiator and a multifunctional acrylate prior to coating and, after being cured, yield high-performance PSAs.

BACKGROUND OF THE INVENTION

Solvent-based, acrylic, pressure-sensitive adhesives (PSAs) are used for high-performance applications because of their excellent balance of peel adhesion and cohesive strength. In general, the constituent polymers of such adhesives have high molecular weights, and the adhesives are characterized by high relative viscosity. Consequently, dilution with solvent is required to make the polymers coatable at ambient temperatures. They are typically coated at a solids content of from 30 to 40% by weight. The solvent is removed (evaporated) immediately following the coating process.

The lower the solids content of the solvent-based adhesive, the more time is required to drive off the solvent after coating. Consequently, it is necessary to employ very slow line speeds during the coating process to ensure a solvent-free coating that has no defects, such as bubbles or skinning. As a result, the cost of manufacturing solvent-based acrylic products is high.

Acrylic hot-melt adhesives were developed to try to match the adhesive performance of solvent-based adhesives while lowering the cost of coating by increasing line speeds. The molecular weight of such adhesives has to be lower than traditional solvent-based acrylics to ensure that the viscosity of the adhesive (100% solids content) is kept within a processable range. This lower molecular weight results in a lower cohesive strength, as shown by low shear performance. Therefore, the adhesive needs to be crosslinked after coating. Unfortunately, excessive crosslinking results in low adhesive peel and tack performance. In addition, hot-melt adhesives have often contained high residual monomers, a characteristic that is unacceptable for medical applications where the adhesives are to be applied to the skin.

U.S. Pat. No. 5,686,504 describes pigmented, crosslinked, pressure-sensitive adhesives that exhibit high cohesive strength. The adhesives are UV-crosslinked through tertiary amine groups (incorporated into the backbone of the adhesive copolymer) and hydrogen-abstracting photoinitiators, which act synergistically and facilitate free radical formation and crosslinking upon exposure to UV light. The adhesives described in the '504 patent are a significant improvement over previous UV light-cured PSAs. However, the use of tertiary amine monomers in the adhesive copolymer precludes the use of acid-containing monomers, like acrylic acid, which could otherwise be used advantageously to make an adhesive copolymer having desirable properties. Such acid monomers must be avoided to ensure that the amine groups remain unprotonated and available for crosslinking by UV light.

A continuing need exists not only for high performance PSAs, but also for compositions that can be coated and crosslinked to form such PSAs, particularly compositions that can be coated both as a hot melt and as a high solids content coating.

SUMMARY OF THE INVENTION

In accordance with a first aspect of the invention, a coatable, acrylic composition comprises, on a percent-by-weight basis, (a) about 85–99.7% of at least one acrylic copolymer; (b) about 0.1–5% of at least one photoinitiator; and (c) about 0.2–10% of at least one multifunctional (meth)acrylate. The acrylic copolymer(s) are formed from a mixture of monomers comprising, on a percent-by-weight basis, based on the total weight of monomers, (i) about 67–93% alkyl acrylate(s), each having an alkyl group with 4–8 carbon atoms; (ii) about 5–20% vinyl lactam(s); (iii) about 1–5% ether monomer(s); and (iv) about 1–8% ethylenically unsaturated carboxylic acid(s); wherein the sum of all monomers is 100%. The composition can be coated as a hot melt (100% solids) or as a high solids content solution (>60% solids), at high line speeds, using conventional coating technology. The composition is readily crosslinked by exposure to ultraviolet (UV) light to yield a high-performance acrylic PSA.

In a second aspect of the invention, a crosslinked PSA tape, label, or similar construction comprises a crosslinked acrylic PSA in contact with at least one substrate. The crosslinked acrylic PSA is obtained by curing (crosslinking) an acrylic composition as described above.

The new compositions can replace existing solvent-based adhesives used in industrial applications that are currently coated at <35 feet per minute (fpm), allowing reduced manufacturing costs and increased solvent coating capacity. The capability of being coated as hot melts (100% solids) makes them attractive for use in the manufacture of very thick coatings (>5 mil) for high performance industrial tapes.

DETAILED DESCRIPTION OF THE INVENTION

Figure 1:
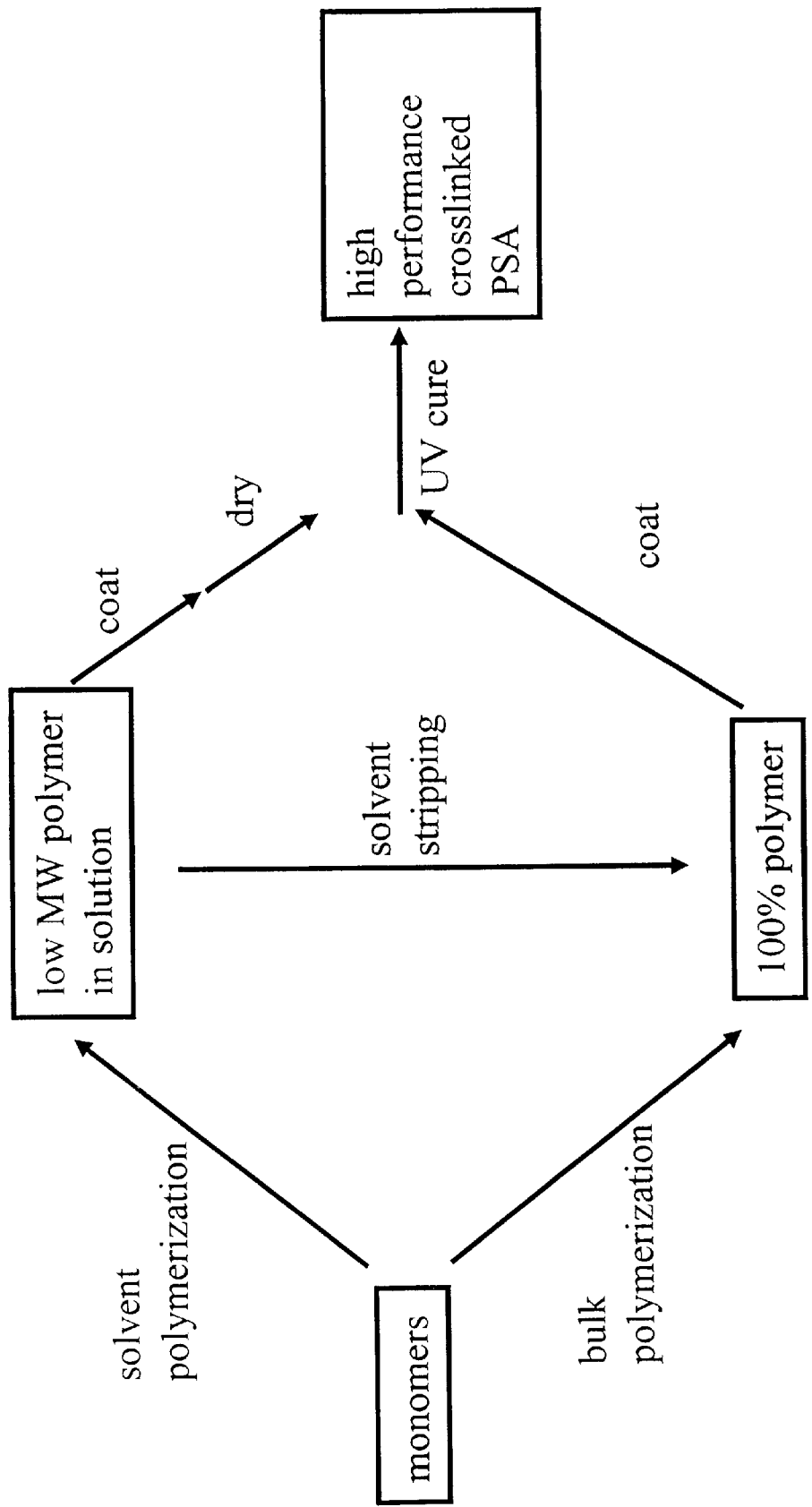
FIG. 1 is a flowchart illustrating how high-performance, crosslinked PSAs are prepared according to the invention, either by solvent polymerization followed by solvent stripping, or by bulk polymerization.

According to one aspect of the invention, a coatable, acrylic composition comprises (a) about 85–99.7% acrylic copolymer(s); (b) about 0.1–5% photoinitiator(s); and (c) about 0.2–10% multifunctional (meth)acrylate(s). When coated on a substrate and cured (preferably by UV irradiation), the composition yields a high performance pressure-sensitive adhesive (PSA) suitable for use in a wide range of applications.

The acrylic copolymer is formed from a mixture of monomers comprising, on a percent by weight basis, based on the total weight of monomers, (i) about 67–93% alkyl acrylate(s), each having 4–8 carbon atoms in the alkyl group thereof; (ii) about 5–20% vinyl lactam(s); (iii) about 1–5% ether monomer(s); and (iv) about 1–8% ethylenically unsaturated carboxylic acid(s), wherein the sum of all monomers is 100%.

Non-limiting examples of alkyl acrylates include butyl, pentyl, hexyl, heptyl, and octyl acrylate, and isomers thereof, with a mixture of butyl acrylate and 2-ethylhexyl acrylate being preferred. Non-limiting examples of vinyl lactams include N-vinyl pyrrolidone, N-vinyl caprolactam, and N-vinyl valerolactam. Substituted vinyl lactams bearing one or more halogen atoms and/or alkyl groups are also included.

As used herein, the term "ether monomer" refers to a copolymerizable molecule containing an ether (R—O—R) group having at least one labile hydrogen. Preferred ether monomers are monofunctional alkoxyalkyl (meth)acrylates, which have the general formula $CH_2=CR^1COO(R^2O)_nR^3$, where $R^1$ is H or $CH_3$, $R^2$ is $C_2$ to $C_{10}$ alkyl, n is 1 to 25, and $R^3$ is $C_1$ to $C_{25}$ alkyl. $R^2$ and $R^3$ can be straight-chain or branched. Non-limiting examples include methoxyethyl acrylate, ethoxyethyl methacrylate, methoxyethoxyethyl methacrylate, ethoxyethoxyethyl acrylate, butyldiethyleneglycol methacrylate, ethoxylated nonylphenol acrylate, ethoxylated lauryl alcohol methacrylate, alkoxylated tetrahydrofurfuryl acrylate, methoxypolyethylene glycol monoacrylate, monomethoxytripropylene glycol monoacrylate, and monomethoxyneopentyl glycol propoxylate monoacrylate.

Non-limiting examples of ethylenically unsaturated carboxylic acids include acrylic acid, methacrylic acid, itaconic acid, and beta-carboxyethyl acrylate, with acrylic acid being preferred. Particularly preferred copolymers are formed from butyl acrylate (BA), ethylhexyl acrylate (EHA), acrylic acid (AA), N-vinyl pyrrolidone, and Photomer 8061 (an ether monomer available from Cognis).

The acrylic copolymer is prepared by free radical solution or bulk polymerization. In a preferred embodiment, the copolymer is prepared by solution polymerization, in a solvent (or mixture of solvents) in which each of the monomers is soluble. Non-limiting examples of such solvents include ethyl acetate, methanol, toluene, methyl ethyl ketone, acetone, hexane, and isopropyl alcohol. Polymerization is initiated using a conventional free radical initiator; non-limiting examples include persulphates, peroxides, hydroperoxides, and azo compounds, such as VAZO™ initiators. The amount of initiator used will, of course, affect the molecular weight of the copolymer. In general, polymerization is carried out with about 0.05% to 1% by weight of initiator, based on the total weight of monomers used. Pilot scale polymerization (and, presumably, commercial scale polymerization) tends to require a lower relative amount of initiator than does laboratory scale polymerization.

In an alternate embodiment, the acrylic copolymer is prepared by bulk polymerization of the monomers, taking care to monitor the heat generated during the polymerization reaction. The reaction temperature must be carefully monitored for the sake of both safety and efficient processing.

After the acrylic copolymer is made, it is compounded with at least one photoinitiator and at least one multifunctional (meth)acrylate. Non-limiting examples of photoinitiators include benzophenone, Michler's ketone, thioxanthones, benzil, and quinones, with benzophenone being preferred. To be effective, the photoinitiator(s) are included in a total amount of from about 0.1–5% by weight, more preferably from about 0.1–1% by weight of the total composition.

Non-limiting examples of multifunctional (meth) acrylates include butanediol dimethacrylate, ethyleneglycol dimethacrylate, diethyleneglycol dimethacrylate, triethyleneglycol dimethacrylate, trimethylolpropane trimethacrylate, butanediol diacrylate, hexanediol diacrylate, trimethylolpropane triacrylate, and tripropyleneglycol diacrylate, made by BASF; trimethylolpropane ethoxy triacrylate, trimethylolpropane triacrylate, tripropylene glycol diacrylate, propylene glycol 400 dimethacrylate, dipropylene glycol diacrylate, dipentaerythritol hydroxy pentaacrylate, neopentyl glycol propoxylate diacrylate, bisphenol A ethoxylate dimethacrylate, made by UCB Chemicals, Radcure; and alkoxylated hexanediol diacrylate, ethoxylated bisphenol A diacrylate, ethoxylated bisphenol A dimethacrylate, ethoxylated trimethylolpropane triacrylate, propoxylated neopentyl glycol diacrylate, propoxylated glyceryl triacrylate, polybutadiene diacrylate, and polybutadiene dimethacrylate, made by Sartomer. Hexanediol diacrylate (HDODA) is preferred.

The multifunctional (meth)acrylate(s) are present in an amount of from about 0.2–10% by weight, more preferably from about 0.4–2% by weight of the composition.

After polymerization and compounding, the resulting composition can be coated on a substrate and cured (crosslinked), preferably by irradiating the coated composition with ultraviolet light. The result is an adhesive construction, such as a tape, label, or similar article. The construction can be converted or otherwise processed using conventional techniques.

Nonlimiting examples of techniques for coating the composition include slot die, air knife, brush, curtain, bar, extrusion, blade, floating knife, gravure, kiss roll, knife-over-blanket, knife-over-roll, offset gravure, reverse roll, reverse-smoothing roll, rod, and squeeze roll coating. The choice of which coating method to use depends on such considerations as which equipment is available, whether the composition is to be applied from solution or as a hot melt, and the desired coat weight (conveniently measured on a dried basis), which generally lies within the range of about 15 to 100 grams per square meter ($g/m^2$ or "gsm"), more preferably about 25 to 30 $g/m^2$.

In one embodiment, the compounded copolymer is coated on a release liner (such as a siliconized paper or film), crosslinked, and then laminated to a flexible backing, i.e., a facestock. Alternatively, the compounded copolymer is coated directly on a facestock, crosslinked, and then protected with a release liner. Self-wound tapes also can be prepared, by coating the compounded copolymer on one side of a tape facestock and crosslinking it. The other side of the facestock is silicone-coated or otherwise treated so that the tape can be wound up on itself without blocking.

EXAMPLES AND TEST METHODS

Several non-limiting examples of acrylic copolymers, coatable acrylic pressure-sensitive adhesive compositions, and UV-crosslinked constructions were prepared, along with several comparative examples. Molecular weight, solution and melt viscosity, gel content, room temperature sheer, and adhesive peel measurements were taken, using the procedures described below. Polymer glass transition temperatures ($T_g$) were determined by differential scanning calorimetry.

Molecular Weight

Weight-average (Mw) molecular weights were determined by GPC. About 200 mg of wet polymer was dispersed in 10 mL of solvent, tumbled for 2 to 4 hours, and filtered through a 0.45 micron PTFE syringe filter. The injection size was 50 L. Calibration was against a set of twelve polystyrene standards obtained from Polymer Labs, ranging from 580 to 1,290,000 Da. Millenium[32] version 3.0 software from Waters was used with the GPC option. Calibration was done daily and a check sample of SRM 706 polystyrene from the National Institute for Standards and Technology (Gaithersburg, Md.) was also analyzed daily with each batch of samples. A Waters (Milford, Mass.) 2690 pumping system was used with a Waters 410 refractive index detector. The columns were three Pigel Mixed-C 300 mm×7.5 mm with a 50 mm×7.5 mm guard column from Polymer Labs (Amherst, Mass.). The mobile phase was THF at 1.0 mL/min.

Gel Content

Gel content is a measure of the amount of polymer that is insoluble in tetrahydrofuran (THF). It is determined as follows: The adhesive polymer is coated on a silicone release liner and dried at 70° C. for 15 minutes. The adhesive is removed from the release liner, and a 60–80 mg sample of the adhesive is accurately weighed out and placed in a 10 micrometer polytetrafluroethylene membrane filter. The edges of the filter are thermally sealed to contain the sample, and the filter is placed in a vial containing about 15 g of THF. The vial is agitated for 72 hours, and the filter is taken out of the solvent and dried at an 120° C. for 120 minutes. The filter is then weighed, and the measurements are used to calculate the percent gel:

% gel=(final weight of sample/initial weight of sample)× 100. The gel content of the uncrosslinked polymers is less than 1%.

Solution and Melt Viscosity

Polymer viscosity was measured at 23–25° C. on a Brookfield viscometer, using a #3 spindle, at 50 rpm, unless otherwise noted. Melt viscosity measurements were conducted in steady shear rate sweep mode with a Rheometrics dynamic stress rheometer with 25 mm parallel plates at 175° C. and a shear rate of $10^{-1}$ to $10^{-3}$ sec$^{-1}$. Thermal stability measurements were conducted in dynamic shear time sweep mode on a Rheometrics RMS800 at 150 and 175° C. in air atmosphere and 10 rad/s for two hours. The measured dynamic viscosity as a function of time is an indicator of the thermal stability of the sample.

Peel Adhesion

The resulting construction was die-cut into 25×204 mm (1×8 in) sized strips. The strips were then applied centered along the lengthwise direction to 50×152 mm (2×6 in) brightly annealed, highly polished stainless steel test panels and rolled down using a 2 kg (4.5 lb.), 5.45 pli 65 shore "A" rubber-faced roller, rolling back and forth once, at a rate of 30 cm/min (12 in/min). The samples were conditioned for 24 hours in a controlled environment testing room maintained at 21° C. (70° F.) and 50% relative humidity. After conditioning, the test strips were peeled away from the test panel in an Instron Universal Tester according to a modified version of the standard tape method Pressure-Sensitive Tape Council, PSTC-I (rev. 1992), Peel Adhesion for Single Coated Tapes 180° Angle, at a rate of 30 cm/min (12 in/min). The force to remove the adhesive test strip from the test panel was measured in lbs/in. All tests were conducted in triplicate.

Room Temperature Shear (RTS)

In static shear testing, the samples were cut into 12×51 mm (½×2 in) test strips. The test strips were applied to brightly annealed, highly polished stainless steel test panels, where the typical size of the test panels was 50×75 mm (2×3 in), making a sample overlap of 12×12 mm (½×½ in) with the test panel. The sample portion on the test panel was rolled down using a 2 kg (4.5 lb.), 5.45 pli 65 shore "A" rubber-faced roller, rolling back and forth once, at a rate of 30 cm/min (12 in/min). After a dwell time of at least 15 minutes under standard laboratory testing conditions, the test panels with the test strips on them were then placed at an angle 2° from the vertical, and a load of 500 g was attached to the end of the test strips. The time in minutes for the sample to fail cohesively was measured by a timer. In the tables, the plus sign after the shear values indicate that the samples were removed after that time and that the test was discontinued. All tests were conducted in triplicate.

Example 1

An acrylic copolymer was prepared by solution polymerization using the ingredients listed in Table 1, according to the following procedure: A polymerization reactor equipped with a heating jacket, nitrogen inlet valve, stirring mechanism, and reflux condenser was purged with nitrogen, the heating jacket was set to 82° C., and an initial charge of monomers and solvents was added. The stirring mechanism was set to 100 rpm. The reactor was heated to 82° C., and a kick-off catalyst (polymerization initiator) in a small amount of solvent was added to the reactor. Once the maximum temperature was obtained, the reactor was held at that temperature for five minutes, and monomer and solvent feed was started at 2.0 grams per minute. After the feed was complete, the reactor contents were held, with stirring, for one hour, after which a first cook-off catalyst was added. The reactor contents were held for one additional hour, and a second cook-off catalyst was added. After holding the reactor for one more hour, the reactor contents were cooled.

Examples 2–4 and Comparative Examples 1–3

Using the monomers listed in Table 2, and following the procedure described above, five different acrylic copolymers were prepared. Comparative Example 1 contained no ether monomers; Comparative Example 2 contained no vinyl lactam monomers; and Comparative Example 3 contained dimethylaminoethyl acrylate (DMAEA), but no ether monomers.

Compounded Coatings and Adhesive Constructions

Examples 1–4 and Comparative Examples 1–3 were compounded with benzophenone and hexanediol diacrylate, at the levels recited in Table 3, by mixing the polymer, photoinitiator, and multifunctional acrylate. The resulting compositions were coated on a substrate using a Bird bar to control the thickness of the coating. The dry coatweight ranged from 27 to 33 g/m². Silicone-coated paper, release liner, was used as the substrate for the gel tests. Polyethylene terephthalate film (2 mil) was used as the substrate for adhesion and shear tests. The coated sample was dried at 70° C. for 10 minutes to evaporate the solvent, and then passed through an American Ultraviolet conveyorized ultraviolet curing system containing a single medium-pressure mercury bulb set to 300 W/in. The line speed typically varied from 25 to 100 f/min. and the dosage was measured using a Uvicure Plus radiometer manufactured by EIT, Inc. For example, at 75 f/min., the dosage was 0.215 J/cm² and the peak intensity was approximately 1.2 W/cm².

TABLE 1

Example 1

| | Weight (%) | Weight (g) | Notes |
|---|---|---|---|
| Monomers | | | |
| Butyl acrylate (BA) | 66 | 174.9 | 66 grams of monomers |
| 2-ethylhexyl acrylate (EHA) | 20 | 53.0 | used in initial charge; |
| Photomer 8061 | 2 | 5.3 | remainder added in |
| N-vinyl pyrrolidone (NVP) | 10 | 26.5 | feed |
| Acrylic acid (AA) | 2 | 5.3 | |
| | 100 | 265.0 | |
| Solvent | | | |
| Ethyl acetate | 85 | 84.5 | |

TABLE 1-continued

Example 1

| | Weight (%) | Weight (g) | Notes |
|---|---|---|---|
| Toluene | 15 | 14.9 | |
| | 100 | 99.4 | Initial charge |
| Ethyl acetate | 85 | 140.8 | |
| Toluene | 15 | 24.8 | |
| | 100 | 165.6 | Used in feed |
| Initiator | | | |
| Vazo64 | | 0.80 | Used in feed |
| Vazo64 | | 0.27 | Added at kickoff |
| Ethyl acetate | | 10 | |
| Vazo 64 | | 0.2 | 1st cookoff catalyst |
| Ethyl acetate | | 5 | |
| Vazo64 | | 0.2 | 2nd cookoff catalyst |
| Ethyl acetate | | 5 | |

Total weight, g 530
Total solids, % 50
Total monomers, g 265
Total solvent, g 265
Initial monomer 66.3
Initial solids 40.0
Initial solvent 99.4
Initial initiator, 0.4%, g 0.27
Feed monomer 198.8
Feed solvent 165.6
Feed solids 54.5
Feed initiator, 0.4%, g 0.80

TABLE 2

Acrylic Copolymers

| | Monomers | | | | | | | Viscosity | | |
|---|---|---|---|---|---|---|---|---|---|---|
| Example | BA | EHA | AA | Photomer 8061 | NVP | DMAEA | $M_w$ ('000s) | Solution[1] (RVT #3) | Melt[2] (175° C. 10/s) | Stability[3] (175° C. 2 hrs) |
| Ex. 1 | 66 | 20 | 2 | 2 | 10 | — | 185 | 2025 @ 50 rpm | 255 | 1200 |
| Ex. 2 | 66 | 20 | 2 | 2 | 10 | — | 430 | 7100 @ 10 rpm | 1710 | 2000 |
| Ex. 3, higher NVP | 63 | 18 | 2 | 2 | 15 | — | 235 | 5650 @ 10 rpm | 433 | 2600 |
| Ex. 4, higher AA | 66 | 18 | 4 | 2 | 10 | — | 206 | 10000 @ 5 rpm | 293 | — |
| Comp. Ex. 1, no ether | 68 | 20 | 2 | — | 10 | — | 188 | 3325 @ 50 rpm | 294 | 1000 |
| Comp. Ex. 2 no NVP | 63 | 32 | 3 | 2 | — | — | 146 | 265 @ 50 rpm | — | — |
| Comp. Ex. 3 | 59 | 30 | — | — | 10 | 1 | 156 | 1920 @ 50 rpm | 236 | 1000 |

[1]Solution viscosity measurements were conducted at ~50% solids. Units are centipoise.
[2]Melt viscosity measurements were conducted at 100% solids. Units are poise.
[3]Units are poise.

TABLE 3

Acrylic Compositions and Performance

| Polymer | Benzophenone (%) | HDODA (%) | U.V. lamp (W/in) | Line speed (ft/min.) | RTS (min.) | 180° Peel to SS (lbs/in) | Gel in THF (%) |
|---|---|---|---|---|---|---|---|
| Ex. 1 | 0.6 | 2 | 300 | 75 | 10000+ | 3 | 61 |
| Ex. 2 | 0.8 | 1.6 | 200 | 60 | 10000+ | 2.1 | 85 |
| Ex. 3 | 0.8 | 1.6 | 300 | 100 | 10000+ | 3.8 | 72 |
| Ex. 4 | 0.6 | 2 | 300 | 75 | 10000+ | 4.2 | 79 |
| Comp. Ex. 1 | 0.5 | 1 | 300 | 75 | 1600 | 2.5 | — |
| Comp. Ex. 2 | 0.5 | 1 | 300 | 25 | 10000+ | 0.6 | 74 |
| Comp. Ex. 3 | 1 | 2 | 300 | 75 | 10000+ | 1 | — |

The invention has been described and illustrated by exemplary and preferred embodiments, but is not limited thereto. Persons skilled in the art will appreciate that a variety of modifications can be made without departing from the scope of the invention, which is limited only by the claims. Throughout the text and the claims, use of the word "about" in relation to a range of numbers is intended to modify both the low and the high values stated.

What is claimed is:

1. A composition comprising, on a percent-by-weight basis:
   about 85–99.7% of at least one acrylic copolymer formed from a plurality of monomers comprising, on a percent-by-weight basis, based on the total weight of monomers, (i) about 67–93% alkylacrylate(s), each alkyl acrylate having an alkyl group with 4–8 carbon atoms; (ii) about 5–20% vinyl lactam(s); (iii) about 1–5% ether monomer(s); and (iv) about 1–8% ethylenically unsaturated carboxylic acid(s);
   about 0.1–5% of at least one photoinitiator; and
   about 0.2–10% of at least one multifunctional (meth)acrylate.

2. A composition as recited in claim 1, wherein the alkyl acrylate(s) comprise a mixture of butyl acrylate and ethylhexyl acrylate.

3. A composition as recited in claim 1, wherein the vinyl lactam(s) are unsubstituted.

4. A composition as recited in claim 1, wherein the vinyl lactam(s) are substituted with one or more halogen atoms and/or alkyl groups.

5. A composition as recited in claim 1, wherein the vinyl lactam(s) are selected from the group consisting of N-vinyl pyrrolidone, N-vinyl caprolactam, and N-vinyl valerolactam.

6. A composition as recited in claim 1, wherein the ether monomer(s) are selected from the group consisting of monofunctional alkoxyalkyl (meth)acrylates.

7. A composition as recited in claim 1, wherein the ether monomer(s) are selected from the group consisting of methoxyethyl acrylate, ethoxyethyl methacrylate, methoxyethoxyethyl methacrylate, ethoxyethoxyethyl acrylate, butyldiethyleneglycol methacrylate, ethoxylated nonylphenol acrylate, ethoxylated lauryl alcohol methacrylate, alkoxylated tetrahydrofurfuryl acrylate, methoxypolyethylene glycol monoacrylate, monomethoxytripropylene glycol monoacrylate, and monomethoxyneopentyl glycol propoxylate monoacrylate.

8. A composition as recited in claim 1, wherein the ethylenically unsaturated carboxylic acid(s) are selected from the group consisting of acrylic acid, methacrylic acid, itaconic acid, and beta-carboxyethyl acrylate.

9. A composition as recited in claim 1, wherein the at least one photointiator is selected from the group consisting of benzophenone, Michler's ketone, thioxanthones, benzil, and quinones.

10. A composition as recited in claim 1, wherein the at least one multifunctional (meth)acrylate is selected from the group consisting of butanediol dimethacrylate, ethyleneglycol dimethacrylate, diethyleneglycol dimethacrylate, triethyleneglycol dimethacrylate, trimethylolpropane trimethacrylate, butanediol diacrylate, hexanediol diacrylate, trimethylolpropane triacrylate, tripropyleneglycol diacrylate, trimethylolpropane ethoxy triacrylate, trimethylolpropane triacrylate, tripropylene glycol diacrylate, propylene glycol 400 dimethacrylate, dipropylene glycol diacrylate, dipentaerythritol hydroxy pentaacrylate, neopentyl glycol propoxylate diacrylate, bisphenol-A ethoxylate dimethacrylate, alkoxylated hexanediol diacrylate, ethoxylated bisphenol A diacrylate, ethoxylated bisphenol A dimethacrylate, ethoxylated trimethylolpropane triacrylate, propoxylated neopentyl glycol diacrylate, propoxylated glyceryl triacrylate, polybutadiene diacrylate, and polybutadiene dimethacrylate.

11. A composition as recited in claim 1, wherein the photoinitiator(s) are present in a total amount of about 0.1–1% by weight of the composition.

12. A composition as recited in claim 1, wherein the multifunctional (meth)acrylate(s) are present in a total amount of about 0.4–2% by weight of the composition.

13. A composition as recited in claim 1, wherein the mixture of monomers comprises about 67–93% of a mixture of butyl acrylate and 2-ethylhexyl acrylate, about 5–20% N-vinyl pyrrolidone, about 1–5% ether monomer(s), and about 1–8% acrylic acid.

14. A composition of matter as recited in claim 1, wherein the mixture of monomers comprises about 66% butyl acrylate, about 20% 2-ethylhexyl acrylate, about 10% N-vinyl pyrrolidone, about 2% ether monomer(s), and about 2% acrylic acid.

15. A composition as recited in claim 1, wherein the least one acrylic copolymer has a weight-average molecular weight of less than 500,000.

16. A pressure-sensitive adhesive (PSA) construction, comprising:
   a crosslinked composition as recited in any one of claims 1–14, in contact with at least one substrate.

* * * * *